United States Patent
Goswami et al.

(10) Patent No.: US 12,344,181 B1
(45) Date of Patent: Jul. 1, 2025

(54) SIDE AIRBAG SYSTEMS AND VEHICLES WITH SIDE AIRBAG SYSTEMS

(71) Applicant: Zoox, Inc., Foster City, CA (US)

(72) Inventors: Swagat Goswami, Cupertino, CA (US); Markus Jost, San Mateo, CA (US); David Maurice Libeaut, Bidford-on-Avon (GB); Goutham Shanmuga Sundaram, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/241,083

(22) Filed: Aug. 31, 2023

(51) Int. Cl.
| | |
|---|---|
| B60R 21/231 | (2011.01) |
| B60R 21/20 | (2011.01) |
| B60R 21/261 | (2011.01) |
| B60R 21/00 | (2006.01) |
| B60R 21/01 | (2006.01) |
| B60R 21/0136 | (2006.01) |
| B60R 21/16 | (2006.01) |

(52) U.S. Cl.
CPC ........ B60R 21/23138 (2013.01); B60R 21/20 (2013.01); B60R 21/261 (2013.01); *B60R 2021/0055* (2013.01); *B60R 2021/01245* (2013.01); *B60R 21/0136* (2013.01); *B60R 2021/161* (2013.01)

(58) Field of Classification Search
CPC . B60R 21/23138; B60R 21/20; B60R 21/261; B60R 21/0136; B60R 2021/0055; B60R 2021/01245; B60R 2021/161
See application file for complete search history.

(56) References Cited

U.S. PATENT DOCUMENTS

| | | | |
|---|---|---|---|
| 7,530,595 B2 | 5/2009 | Naruse | |
| 7,669,889 B1* | 3/2010 | Gorman | B60R 21/207 |
| | | | 280/730.2 |
| 10,800,369 B2 | 10/2020 | Hioda | |
| 11,485,311 B2 | 11/2022 | Yamabe | |
| 2007/0182131 A1 | 8/2007 | Helbig | |
| 2009/0020988 A1* | 1/2009 | Sato | B60R 21/23138 |
| | | | 280/730.2 |
| 2009/0039623 A1 | 2/2009 | Kawabe | |

(Continued)

FOREIGN PATENT DOCUMENTS

JP      5664537 B2    2/2015

OTHER PUBLICATIONS

Office Action dated Mar. 11, 2025 for U.S. Appl. No. 18/811,585.

*Primary Examiner* — Jason D Shanske
*Assistant Examiner* — Matthew James O'Neill
(74) *Attorney, Agent, or Firm* — EIP US LLP

(57) ABSTRACT

A bench seating and side airbag system is provided. The system comprises a back portion and a side portion. The back portion has an interior facing interior facing surface and an exterior facing surface opposite the interior facing surface. The side portion and the back portion are positioned to define a seam between the back portion and the side portion. A chamber is configured to be mounted proximate the seam and behind the exterior facing surface of the back portion. An inflator is coupled to the chamber and configured to inflate the chamber. When inflated, the chamber extends through the seam and beyond the interior facing surface of back portion along the side portion.

20 Claims, 11 Drawing Sheets

(56) References Cited

U.S. PATENT DOCUMENTS

| | | | |
|---|---|---|---|
| 2013/0009431 A1* | 1/2013 | Acker | B60R 21/237 |
| | | | 297/216.13 |
| 2016/0009247 A1 | 1/2016 | Fujiwara | |
| 2016/0068129 A1* | 3/2016 | Tanabe | B60N 2/986 |
| | | | 280/728.3 |
| 2019/0135218 A1* | 5/2019 | Takahashi | B60R 21/207 |
| 2020/0094771 A1* | 3/2020 | Jost | B60R 21/207 |

* cited by examiner

SIDE AIRBAG SYSTEMS AND VEHICLES WITH SIDE AIRBAG SYSTEMS

BACKGROUND

Vehicles may be equipped with side airbags to protect passengers riding therein from side impact with an object, such as, for example, another vehicle. Upon deployment, conventional side airbags may expand into the passenger compartment from a bolster of the seat and may tear the seat trim upon deployment. Tearing the seat material during deployment can increase the chance of injury for the passenger due to excess materials, such as pieces of trim, being thrown into the passenger compartment.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
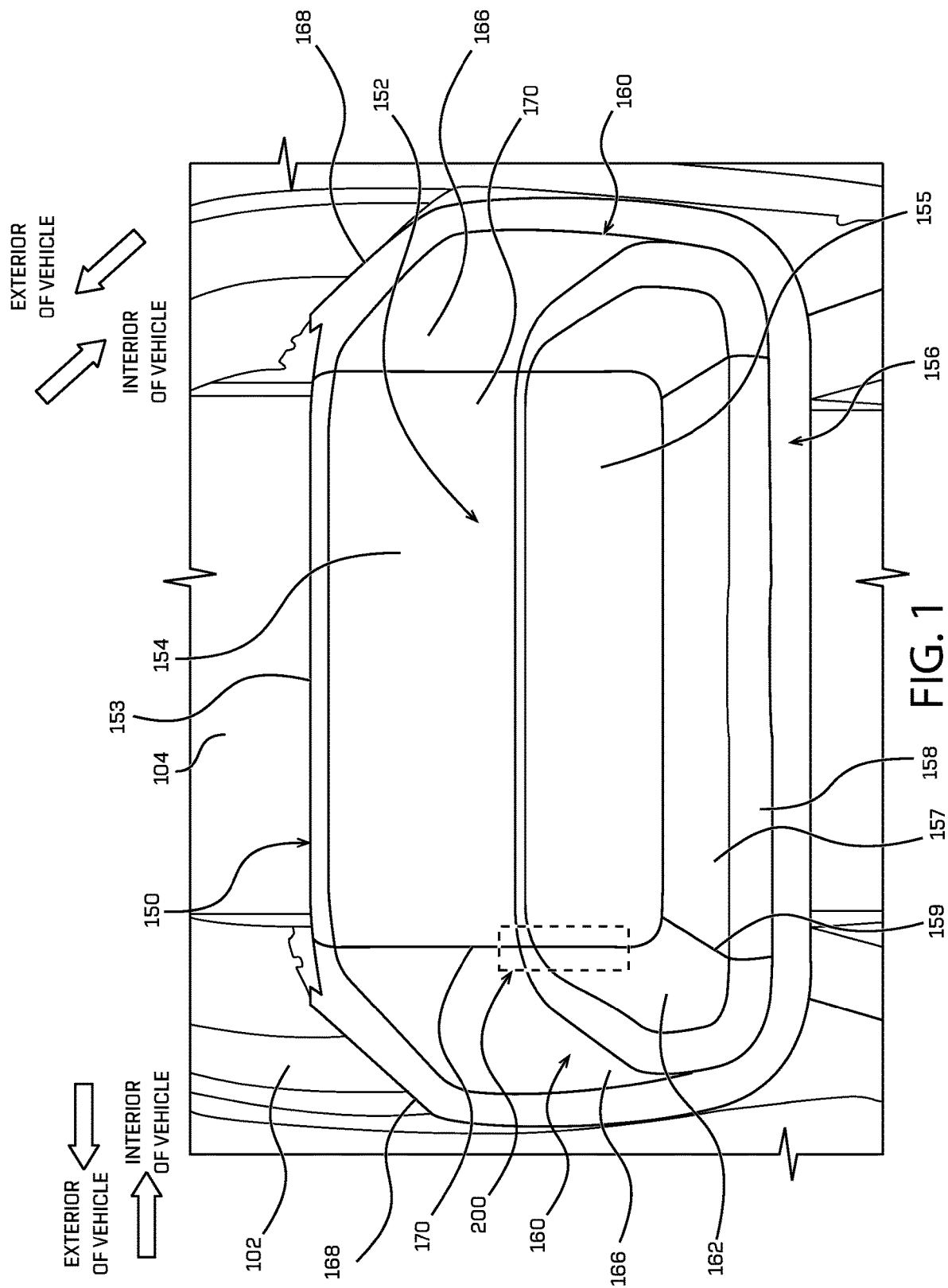
FIG. 1 is a perspective view illustrating an example bench seat assembly within a vehicle having an example side airbag system.

This disclosure is directed to side airbag systems and vehicles comprising side airbag systems. The side airbag systems are constructed and arranged to protect a vehicle passenger from impacts, such as, impacts with another vehicle, a pole, a wall, or the like. In examples, the side airbag systems may be configured for use with a seat assembly such as a vehicle bench seat mounted in a passenger compartment of a vehicle, for example, in a passenger compartment of a vehicle having a carriage style seating arrangement where bench seats face each other within the passenger compartment. An example carriage style seating arrangement is shown and described in U.S. Pat. No. 11,117,543, which is incorporated herein by reference in its entirety for all purposes. A bench seat may be a seating arrangement designed to seat multiple occupants and may comprise a common or shared seating surface for the multiple occupants. In examples, a bench seat, may be constructed without conventional vehicle seat features such as a bolster. A bench seat, in examples, may comprise a back portion, an adjacent seat, and a seat portion. The back portion may provide support for an occupant's back. The seat portion may provide a seat base upon which an occupant may sit. The adjacent portion may be a side portion, which may be positioned at an outer side of the bench seat, and may provide a side support for an occupant and/or act as a barrier between the occupant and a body of the vehicle. In alternative examples, the back portion may be a first back portion associated with a first passenger position, and the adjacent portion may be a second back portion associated with a second passenger position, the second passenger position adjacent to the first passenger position on the bench seat. The second back portion may be adjacent to the first back portion. In examples of the present disclosure, the adjacent portion and the back portion may be positioned to define a seam between the adjacent portion and back portion. The seam may comprise a gap or abutment between a back portion and an adjacent portion (which may be an adjacent side portion or an adjacent second back portion). The back portion may comprise an interior facing surface. The back portion may comprise an exterior facing surface, opposite the interior facing surface. As used herein, interior may refer to components or surfaces which are positioned further into an interior of the vehicle as compared to other exterior components or surfaces. Equivalently, an interior facing surface may be considered the surface facing or proximal to an occupant, when present in the bench seat or seat assembly. In other words, the exterior facing surface of the back portion may be positioned or face towards the back of the seat assembly, considered from the point of view of an occupant sitting in the seat assembly.

According to examples of the present disclosure, a side airbag system may comprise a chamber (or airbag) configured to be positioned proximate the seam, behind the exterior facing surface of the back portion. In other words, the chamber may be configured to be mounted behind the seat or seat assembly. For example, the chamber may be configured to be mounted to, or may be mounted to, a vehicle body or otherwise mounted between the back portion of the seat assembly and the vehicle body. When inflated by an inflator, the chamber may expand through the seam between the side portion and the back portion (and/or seat portion), and may expand beyond the interior facing surface of the back portion, e.g., in a forwards direction into the vehicle interior, when considered from the point of view of an occupant sitting in the seat assembly. Where the adjacent portion is a side portion, the chamber may extend along the side portion. Thus the inflated chamber may extend between the side portion and a passenger. Where the adjacent portion is a second back portion, the inflated chamber may extend between a first passenger position and a second passenger position. In such examples the chamber may be configured to protect passengers in both seating positions. For example, the chamber may comprise respective compartments for each passenger. The direction of expansion of the chamber may also be considered to be in a longitudinal direction with respect to the vehicle, e.g., in a direction extending from a front to a back of the vehicle, as contrasted with a lateral direction extending from a first side of the vehicle to a second side of the vehicle, e.g., first and second sides of the vehicle where passenger doors may be located. Thus, the chamber may expand along the side of a seated occupant and provide a contact surface for contacting the occupant, for example, to cushion an impact and thereby protect, for example, a region including the pelvis and/or the thorax during an impact. Thus examples of the present disclosure may provide a side airbag system for a vehicle bench seat or seat assembly (e.g., for use in a vehicle having a carriage style seating arrangement), which expands into the passenger chamber to provide a direct contact with an occupant for maximal impact cushioning, without having to tear through a seat material. Such arrangements may therefore improve the safety of an occupant of a vehicle bench seat during an impact, such as a side impact. By expanding through a seam and into the passenger chamber, the airbag may take any desired shape and form, without being limited by the shape of components of the seat assembly. For example, the airbag when inflated may be longer than a side portion of the seat assembly, for example, providing protection for both a pelvis and a thorax of a passenger. Further, by expanding through a seam and directly into the passenger chamber, fast deployment of the airbag may be achieved.

In some examples, inflation of the chamber may cause the chamber to expand in a first direction away from the back portion, e.g., in a forward direction or towards an occupant if an occupant were seated in the seat assembly, or towards an occupant facing surface of the back portion; and in a second direction towards a roof of the vehicle. Such expansion may occur in two parts: first expansion in the first direction; and subsequent second expansion in the second direction Alternatively, such expansion may occur in both directions simultaneously. Such examples may provide an airbag covering a substantial or entire length of an occupant's torso, from a chamber stowed, when not deployed, with a small volume. For example, the airbag may comprise a thorax airbag or a thorax-pelvis airbag, e.g., the airbag may, when inflated or deployed, be shaped and arranged so as to protect or over a region of seated occupant that includes the thorax and pelvis or a substantial portion of the thorax and pelvis. In other examples, such an expanded airbag may be achieved by storing the chamber, before inflation, behind the seam such that it extends at least 50%, or at least 60%, or at least 75% of a length of the seam. The chamber may then expand in a single direction, outwards along the first direction, to provide a full-length airbag.

In some examples, the side airbag system may comprise one or more deflectors configured to limit expansion of the chamber during inflation of the chamber along a lateral direction. The lateral direction may extend away from an interior surface of a side portion of the bench seat. The lateral direction may extend from a first side of the vehicle to a second side of the vehicle, and/or from a first side portion of the bench seat to a second side portion of the bench seat. Such a deflector may ensure that the expansion is directed in a direction longitudinally forwards along a side of the seated occupant, providing the intended impact protection, and also limit chances of the airbag extending sideways into the occupant.

In some examples, the side airbag system may comprise a mounting compartment. The chamber may be stored in the mounting compartment prior to inflation. The chamber may be held within, retained, or otherwise coupled to the mounting compartment. The mounting compartment may be coupled to the vehicle, e.g., coupled to the vehicle body. Thus the chamber may be coupled to the vehicle via the mounting compartment. In some examples, the mounting compartment may be shaped to provide the deflector. For example, the mounting compartment may comprise a cover portion or door that closes the mounting compartment when the chamber is not inflated, and which rotates under pressure from the expanding chamber to extend substantially in longitudinal direction towards the vehicle interior, parallel to a direction between the exterior facing surface and interior facing surface of the back portion. In this way, there may be a solid support blocking sideways movement of the chamber as it exits the mounting compartment during inflation.

In examples, the deflector may be configured to limit injection of air into the chamber along the lateral direction during inflation. For example, the deflector may be part of the inflator, or may be a separate component positioned to direct air flowing out of the inflator.

In examples, a first portion of the back portion may be configured to deform, for example, by bending under pressure from the chamber during inflation. The first portion of the back portion may therefore form the deflector.

Such examples may limit sideways expansion of the chamber, providing the advantages above, with minimal impact on the size or number of components of the side airbag system.

In examples, a hinge, may be connected to the back portion of the seat assembly, e.g., to an exterior facing surface of the back portion. It should therefore be appreciated that the hinge may be considered part of the back portion or seat assembly in examples. Inflation of the chamber may cause the hinge and the back portion to deform by, for example, bending. In other words, the back portion of the seat assembly may bend or move via hinging at a hinge point during expansion of the chamber. The hinge may assist in providing a definite point at which the back portion deforms or bends under pressure from the chamber expansion and thus assist in providing consistent behavior of the back portion during chamber expansion. Further still, the hinge may provide the deflector discussed above, limiting sideways expansion of the chamber.

In some examples, the chamber may be stowed in an unfolded condition. In examples, since the chamber is unfolded, it may be configured for fast deployment upon impact, thereby reducing a potential for passenger injuries associated with the passenger being out of position. In some examples, the chamber may be stowed in a folded condition. The folded condition may include a roll fold, a tuck fold, a z-fold, or other folded pattern. As mentioned above, the chamber may be stowed in a mounting component, or other storage container.

In some examples, the chamber may include a chamber with a single compartment configured to hold gas. In other examples, the chamber may include multiple compartments configured to hold gas. In such examples, the multiple compartments may include different sizes, shapes, materials, gas pressures, or the like. The inflator may include a cold gas inflator, a pyrotechnic inflator, a hybrid inflator, or any other inflator configured to fill the chambers with gas.

In some examples, the inflator may be configured to inflate the chamber upon receipt of an impact signal from an impact sensor. The impact sensor may detect a collision and send an electrical signal to the inflator to cause the inflator to deploy the airbag (e.g., fill the chamber(s) with gas). Additionally, or in the alternative, the vehicle may include perception sensors configured to perceive objects in an environment of the vehicle and send sensor data to a vehicle computing device. The perception sensors may include, for example, image capture devices (RGB cameras, intensity cameras, infra-red cameras, stereo cameras, depth cameras, etc.), light detection and ranging (LIDAR) sensors, and radio detection and ranging (RADAR) sensors, or the like. In some examples, the vehicle computing device may receive sensor data from the perception sensors and may determine that an impact is imminent. In some examples, a determination that an impact is imminent may be based on a time associated with an impact being within a threshold time (e.g., 3 seconds, 5 seconds, etc.). The threshold time may be a pre-determined amount of time and/or may be based on a speed of the vehicle and/or the object, an acceleration of the vehicle and/or the object, weather, traffic density, and/or other considerations. Based on a determination that the side impact is imminent, the vehicle computing device may send a signal to the inflator to cause the inflator to fill the chamber with gas prior or concurrently with the impact. Thus the impact sensor may be configured to generate the impact signal based at least in part on predicting that an impact is imminent. The impact sensor may comprise, or be part of, a computer system of the vehicle, such as a perception component. Thus the chamber may be inflated shortly before an impact, increasing safety for the occupant.

In various examples, one or more of the adjacent portion, back portion, or seat portion may be configured to be removed and/or replaced without disturbing the airbag. For example, an airbag may be mounted to a vehicle frame and an entire bench seat assembly may be removed and/or replaced without disturbing the airbag. For another example, an airbag may be mounted to an internal component of the bench seat assembly, and a seat cushion may be removed and/or replaced without disturbing the airbag.

FIG. 1 illustrates an example of a bench seat assembly according to various examples of the present disclosure. FIG. 1 shows the interior of a vehicle comprising a body 102 defining a passenger compartment 104. A seat assembly 150 may be disposed in the passenger compartment 104. As illustrated, the seat assembly 150 may be a bench seat assembly, i.e., shaped for multiple occupants without a divide between adjacent seats. The term body as used herein may comprise carbon fiber or any material suitable to serve as a body of a vehicle, such as steel or aluminum. In examples, the vehicles herein may comprise a floor area, platform and/or frame that may be separately attached to a vehicle body or may be formed as a single continuous or integral component of the body. The term body herein is not limited to vehicles having a unibody construction. In examples, the term body as used herein may comprise a body-on-frame construction and thus the body may comprise the vehicle body, the vehicle frame, or both the vehicle body and the vehicle frame. It should be appreciated that the term body herein may be considered a chassis and the term body may comprise any structure and arrangement suitable for use with any of the side airbag systems herein and the vehicles comprising such side airbag systems. The term passenger compartment may be considered to be an internal space defined by the vehicle body 102, in which vehicle occupants can sit. For example, the passenger compartment may be shaped such that it can contain one or more seat assemblies 150.

FIG. 1 illustrates directions as being towards the interior or the exterior of the vehicle. Surfaces of components discussed below may be defined with respect to these directions. The vehicle body 102 may generally be considered to comprise a front, a back, and two sides. A longitudinal direction may extend between the front and back of the vehicle. A lateral direction may extend between the two sides of the vehicle.

The seat assembly 150 may comprise a back portion 152, a seat portion 156, and at least one side portion 160. The side portion 160 may be an example of an adjacent portion. In some examples, as in the illustrated example, the seat assembly 150 may comprise a first side portion 160 and a second side portion 160 located at opposite lateral end portions of the back portion 152 and seat portion 156. The back portion 152 may comprise an interior facing surface 154. The interior facing surface 154 may face an occupant, when the occupant seated in the seat assembly 150. The back portion 152 may further comprise an exterior facing surface 153, opposite to the interior facing surface 154. The exterior facing surface 153 is not visible in FIG. 1. The back portion 152 may also comprise a back cushion 155, which may be integral with or separate to the interior facing surface 154. The side portion 160 may comprise an interior facing surface 166 and an exterior facing surface 168. The side portion 160 may comprise a side cushion 162. The side cushion 152 may be integral with the side portion 160's interior facing surface 166 or may be separate to the interior facing surface 166.

The seat portion 156 may comprise a seat cushion and a seat base. The seat base may provide support for the seat, and may for example be coupled to a floor of the vehicle or otherwise attached to the body 102 of the vehicle. The seat base may be contiguous with the side portion 160, as shown in FIG. 1. The seat cushion may be contiguous with the side cushion 162. In some examples, the seat base may be considered to be part of a seat pan with the side portion 160, which may be coupled to the body 102 of the vehicle via for example via a seat tub.

The seat portion 156 may define a seating area 157 for an occupant. In some examples, the seat portion 156 may be shaped so as to identify the seating area 157. For example, the seating area 157 may provide a surface on which an occupant may sit. In examples, it should be appreciated that the seat portion 156, for example of a bench seat, may comprise two seating areas located adjacent each other on opposite lateral sides of seat portion 156 and share a common seating surface. In some examples, the seating area 157 may be indicated by markings on the seat portion 156. In some examples, the seating area 157 may be defined, at least in part, by a seam between the seat portion 156 and the side portion 160. In some examples the seating area 157 may be defined by an occupant restraint, such as a seat belt. An occupant restraint may be coupled to the seat portion 156 at a first mounting position, and may be attachable to a buckle that is coupled to the seat portion 156 at a second mounting position. The seating area 157 may be defined as being between the first and second mounting positions. In some examples, the seating area 157 (or seat portion 156 more generally) may comprise a front edge or front surface 158. The front edge 158 may represent a longitudinal front of the seat assembly 150, towards which a chamber of an airbag system may expand as discussed below. The seating area 157 may comprise an exterior side 159, i.e. a lateral side of the sitting position 157 that is proximal the vehicle exterior. As discussed further below, a chamber of a side airbag system may expand into the space between the side portion 160 and the external side 159 of the seating area 157. In this way, as an occupant will be seated within the seating area 157, the chamber may expand without hitting the occupant.

The back portion 152, side portion 160, and seat portion 156 may comprise a plastic material (e.g., polypropylene, polyethylene, etc.), a metal material (e.g., aluminum, titanium, etc.), a composite material (e.g., carbon fiber, fiber glass, etc.), or a combination thereof. Any cushions, such as a back cushion or side cushion may include a foam material (e.g., polystyrene, polyethylene, etc.), a polyurethane material, a rubber material (e.g., polyisoprene, EPDM ethylene propylene, neoprene, etc.), a fabric material (e.g., cotton, polypropylene, etc.), or a combination thereof.

In examples such as that illustrated in FIG. 1, the back portion 152 may extend continuously across the length of the seat assembly 150 (e.g., from a first side portion 160 to the second side portion 160 at the other lateral end of the seat assembly 150). In other examples, the back portion may comprise separate portions. For example, the back portion 150 may comprise a first back portion associated with a first seating position and a second back portion associated with a second seating position (and/or with a region between seating positions, for example a central region associated with an arm rest(s)). Such separate portions of the back portion 150 may be positioned to define seams between the separate portions. For example, a first back portion and a second back portion may be positioned to define a seam between the first back portion and the second back portion. In such examples, a side airbag system 200 may be positioned behind the seam between respective back portions, similarly to how the side airbag system 200 is positioned behind the seam 170 in FIG. 1. Such a side airbag system may comprise a chamber which, when inflated, extends through the seam and into the interior of the vehicle 100 in a similar manner to the chamber 202 discussed below in relation to the example of FIG. 1. Other than lateral position, such a side airbag system 200 may be positioned, configured, and/or operate similarly to the side airbag system 200 described below. In such examples, the second back portion may be considered an adjacent portion, adjacent to the first back portion.

Figure 2A:
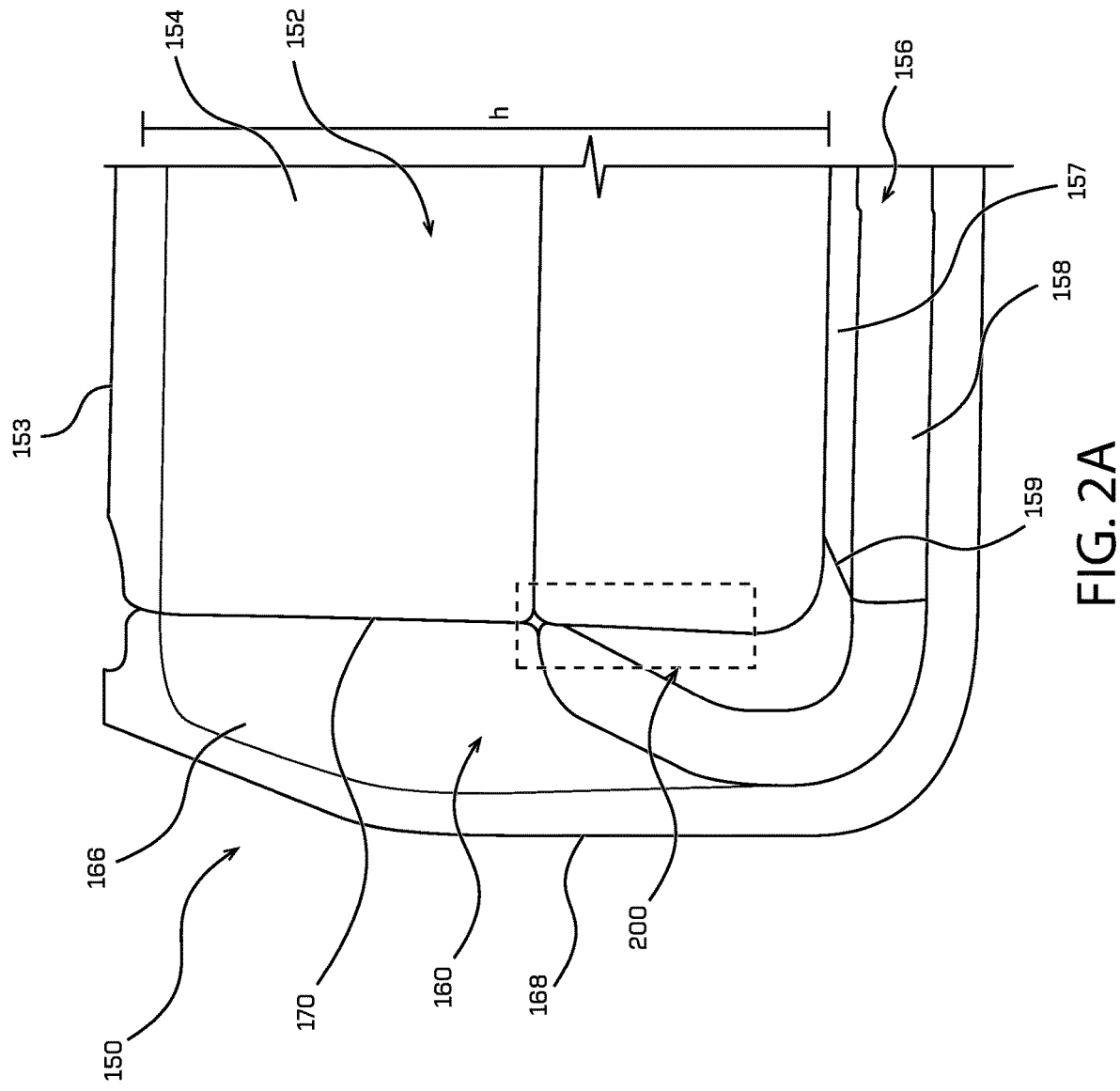
FIG. 2A is a perspective view illustrating a portion of the example bench seat assembly of FIG. 1 having an example side airbag system in an undeployed or stowed state.

FIG. 2A shows an expanded view of a portion of the seat assembly 150 of FIG. 1. As can be seen in this figure, the back portion 152 and the side portion 160 may be positioned to define a seam 170. As in the illustrated example, the seam 170 may be formed or defined by the side portion 160 and the back portion 152 being positioned adjacent to, or abutting one another. In examples, the seem may define a gap or opening between the side portion 160 and the back portion 152.

FIGS. 1 and 2A further illustrate the position of an example side airbag system 200 in an undeployed state. The side airbag system 200 may be mounted behind the back portion 152. In other words, the side airbag system 200 may be mounted further towards the vehicle exterior (and in particular, further towards the exterior along a longitudinal axis of the vehicle between vehicle front and vehicle back) than the exterior facing surface 153 of the back portion 152. The side airbag system 200 may be mounted to the vehicle body 102. Thus the side airbag system 200 may be located behind the seat assembly 150 when considered from the point of view of FIG. 1 and FIG. 2A, and as such is represented by a broken line in FIG. 1 and FIG. 2A. It is noted that the external facing surface 153 of the back portion 152 may face towards either the front or the back of the vehicle, depending on the orientation of the seat assembly 150 within the passenger compartment 104. Indeed, in the case of carriage style seating, a first seat assembly 150 may have an external facing surface 153 of its back portion 152 facing the back of the vehicle; and a second seat assembly 150 may have an external facing surface 153 of its back portion 152 facing the front of the vehicle.

In the example shown in FIGS. 1 and 2A, the chamber of the side airbag system 200, when not deployed, may have a relatively small volume. For example, the side airbag system 200 may extend along only a small portion of a length h of the seam 170. For example, the side airbag system 200 (e.g., a mounting compartment and/or chamber of the side airbag system) may be shaped and mounted such that it in the undeployed state, the chamber extends along less than 50%, or less than 40%, or less than 30%, or less than 25%, or less than 20% of the length h of the seam 170. The seam 170 itself may have any length relative to the back portion 152. For example, the seam 170 may extend fully from a bottom to a top of the back portion 152, as in the illustrated example. Alternatively the seam 170 may extend only a portion of the length of the back portion 152.

Figure 2B:
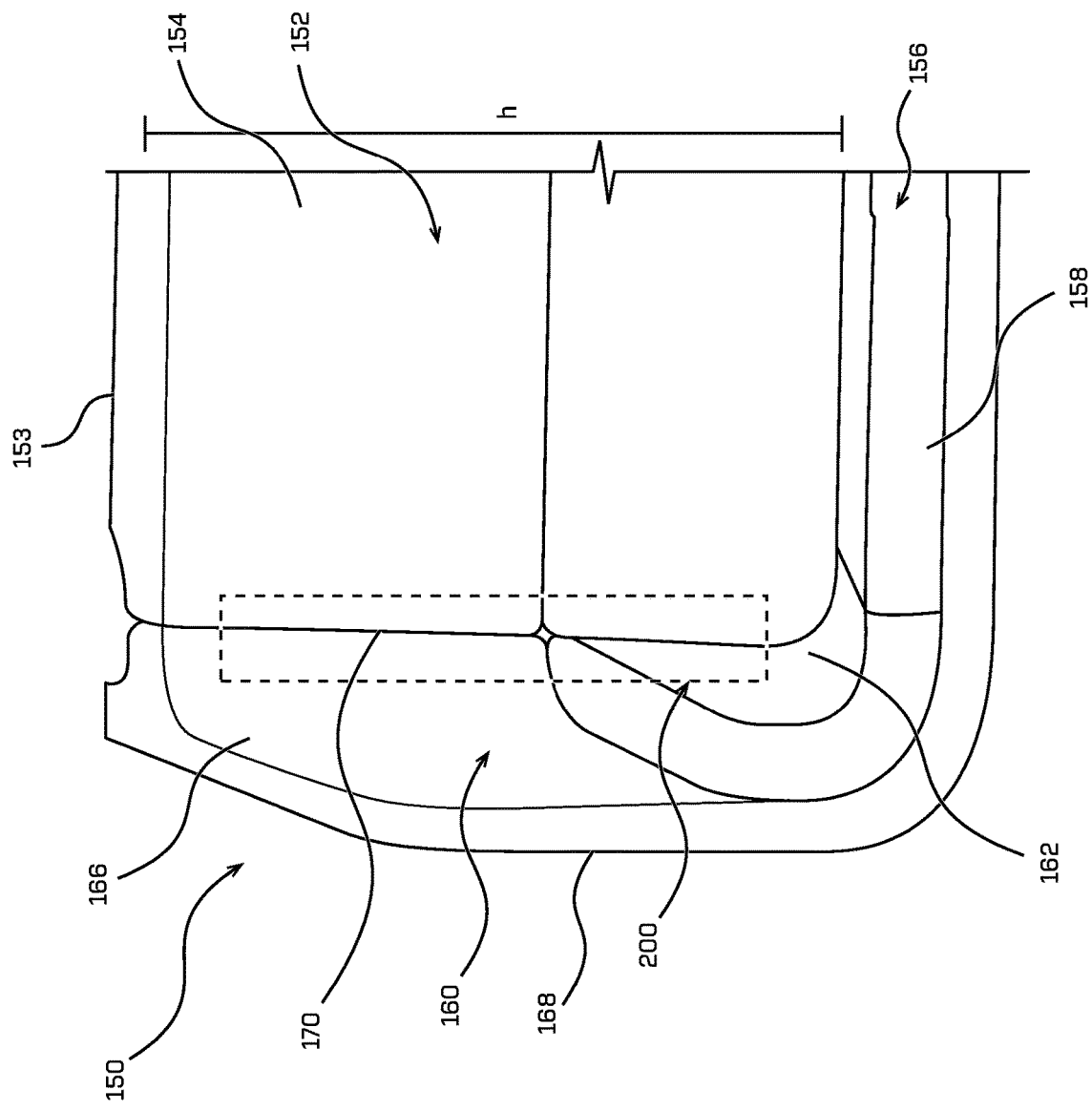
FIG. 2B is a perspective view illustrating a portion of an alternative example bench seat assembly having an alternative example side airbag system in an undeployed or stowed state.

FIG. 2B illustrates the shape and position of an alternative example side airbag system 200. In this example, the side airbag system 200 may extend along at least a majority of the length h of the seam 170. For example, this may allow a chamber of the side airbag system 200 to be stowed with less folding than in the example of FIG. 2A. This may for example allow for faster deployment of the side airbag system.

Figure 2C:
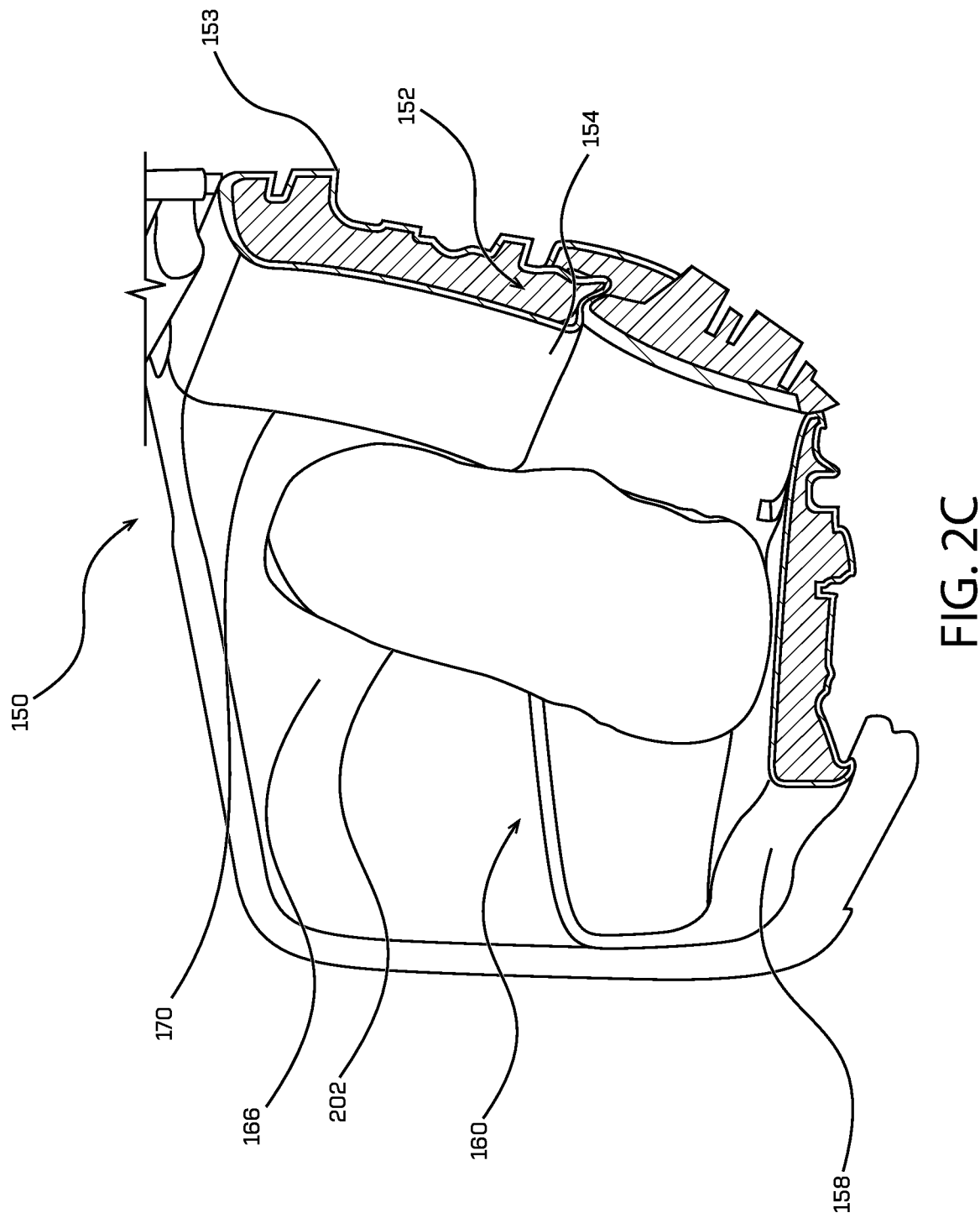
FIG. 2C is a perspective view illustrating a portion of the bench seat assembly of FIG. 1 having an example side airbag system in a deployed state.

FIG. 2C illustrates the seat assembly 150 and side airbag system 200, this time with the side airbag system 200 in a deployed state. FIG. 2C may be considered to show the deployed airbag of the side airbag system 200 of either FIG. 2A or FIG. 2B. The side airbag system 200 may comprise a chamber 202. To place the side airbag system 200 in the deployed state, the side airbag system may comprise an inflator 204 (illustrated in FIG. 3A). The inflator 204 may be configured to inflate the chamber 202 to deploy the side airbag system. When inflated, the chamber 202 may extend through the seam 170 between the side portion 160 and the back portion 152. The chamber 202 may extend in a longitudinal direction, e.g., in a direction from the back portion 152 to the front edge 158 of the seat portion 156. Equivalently, the longitudinal direction may be a direction from the exterior facing surface of the back portion 152 to the interior facing surface 154 of the back portion. The inflated chamber 202 may in some examples extend substantially a full length between the back portion 152 and the front edge 158 of the seat portion 156. In other examples, the chamber 202 may extend along only a portion of a length between the back portion and the front edge 158 of the seat portion 156.

In some examples, the chamber 202 may include two or more compartments configured to hold gas. In such examples, the compartments may be the same or different sizes, shapes, materials, etc. In some examples, the chamber 202 may comprise a first compartment shaped and arranged to protect a passenger's pelvis, and a second compartment shaped and arranged to protect a passenger's thorax. In some examples, the compartments may be configured to hold the same or different gas pressures. For example, a first compartment for protecting a pelvis may be inflated to a higher pressure than a second compartment for protecting a thorax. As discussed further below in relation to FIG. 5, in some examples the compartments may be arranged to inflate at different times. For example a first compartment for protecting an occupant's pelvis may be inflated prior to a second compartment for protecting an occupant's thorax. In some examples, the chamber 202 may include a single compartment configured to hold gas. The chamber 202 may include a fabric material, such as, for example, nylon, cotton, silk, polyester, wool, or the like. The inflator 204 may include a pyrotechnic inflator, a cold gas inflator, a compressed gas inflator, a hybrid inflator, or the like. The inflator 204 may be configured to receive a signal indicating a collision and/or an imminent collision with an object and based on the signal may fill the chamber 202 with gas.

The chamber 202 may be formed from, for example, from a woven nylon fabric and/or other similar materials, or materials having suitable characteristics for the vehicles and vehicle side airbags herein. In examples, the chamber 202 may comprise a first panel and a second panel. The second panel may be connected to or attached to the second panel. The first panel may be similarly shaped and sized to the second panel. In some examples, first panel may be formed of, or comprise, a first generally rectangular flat piece of material, while the second panel may be formed of, or comprise, a second generally rectangular flat piece of material that is similarly shaped and sized to the rectangular flat piece of material of the first panel. The material of first panel and second panel may be in various examples comprise the same material, e.g., woven nylon fabric and/or other similar materials, or materials having suitable characteristics for the vehicles and side airbags herein.

The inflator 204 of the side airbag 102 may be configured to receive a signal indicating a collision and/or an imminent collision with an object. In some examples, the inflator 204 may receive the signal from one or more impact sensors (not shown). The impact sensor(s) may detect a collision and send an electrical signal to the inflator 204 to cause the inflator 204 to deploy the side airbag system 200 (e.g., fill the chamber(s) 202 with gas).

As will be discussed in further detail below with regard to FIG. 7, the vehicle may include perception sensors configured to perceive an environment and send sensor data to a vehicle computing device. The perception sensors may include image capture devices, LIDAR sensors, and RADAR sensors, or the like. In some examples, the vehicle computing device may receive sensor data from the perception sensors and may determine that a side impact is imminent. A determination that a side impact is imminent may include detecting an object (e.g., another vehicle, pole, wall, etc.) in the environment and determining that the object has a high closure rate toward a side of the vehicle (e.g., the vehicle sliding toward the object, an object trajectory aimed at side of the vehicle, etc.), and/or determining that a predicted trajectory of the object intersects with a trajectory or planned path of the vehicle. Based on the determination that the side impact is imminent, the vehicle computing device may send a signal to the inflator 204 to cause the inflator 204 to fill the chamber 202 with gas prior or concurrently with the side impact.

In various examples, the vehicle computing device may be configured to determine a predicted time of impact. The predicted time of impact may be based on a speed of the vehicle, an acceleration of the vehicle, a speed of the object, an acceleration of the object, a closure rate of the object toward the vehicle, road conditions, weather conditions, and/or other factors that may affect a closure rate of an object toward a vehicle or vice versa. In some examples, the vehicle computing device may send a signal to the inflator to deploy concurrently with or immediately prior to (e.g., 0.1 milliseconds, 0.2 milliseconds, 0.5 milliseconds, etc.) the time of impact.

In some examples, a determination that the side impact is imminent may be based at least in part on the predicted time of impact. In some examples, the vehicle computing device may determine that the side impact is imminent based on the predicted time of impact being within a threshold period of time (e.g., 2 seconds, 4 seconds, 6 seconds, etc.). In various examples, the threshold period of time may be a predetermined time period. In such examples, the threshold period of time may include a constant value. In some examples, the threshold period of time may be determined based on a speed of the vehicle and/or object, an acceleration of the vehicle and/or object, weather, traffic density, and/or other factors affecting closure rates and/or vehicle control.

In various examples, the seat assembly 150 may include a position sensor (not illustrated), configured to determine whether an occupant is seated in the seat assembly 150. In some examples, the position sensor may include a weight switch configured to determine whether a weight is located in or on the seat assembly 150. The weight may include a minimum weight associated with a passenger 150 (e.g., 50 pounds, 25 kilograms, 100 pounds, etc.). In various examples, the position sensor may include an image capture device and/or other perception sensor disposed above the seat assembly 150 or elsewhere within the passenger compartment 104 of the vehicle. In such examples, the image capture device and/or other perception sensor may send sensor data to the vehicle computing device to analyze and determine whether the object in the seat assembly is an occupant. In the case of an occupant, the perception sensor may also determine a size and/or shape of the occupant.

In various examples, the position sensor and/or the vehicle computing device may send an arming signal to the inflator 204 based on a determination that the seat assembly 150 is occupied. Responsive to receiving the arming signal, the inflator 204 may arm (e.g., turn on, activate to be ready for a deployment signal, etc.). In some examples, the position sensor and/or the vehicle computing device may send a deployment instruction to the inflator 204. The deployment instruction may include an instruction on how to deploy the side airbag system 200 (e.g., a speed of inflation, a pressure related to inflation, etc.). For example, the position sensor and/or the vehicle computing device may determine that an occupant is a child and may send a deployment instruction to the inflator to cause the inflator, upon deployment, to reduce a pressure of the chamber 202 to soften the impact for the child.

In various examples, some or all of the seat assembly 150 may configured to be removed and/or replaced without disturbing (e.g., decoupling, removing, disarming, etc.) the side airbag system 200. For example, one or more of the back portion 152, seat portion 156, and/or side portion 160, or any part of these components (such as cushions), may be removable. A removal of at least a portion of the seat assembly 150 without disturbing the side airbag system 200 may decrease complexity and/or time associated with performing maintenance, cleaning, and/or removal of parts of the vehicle. In examples, back portion 152, seat portion 156, and/or side portion 160 may be unconnected to (e.g. not touching, or not otherwise coupled except via the body 102) the side airbag system 200, and in particular the chamber 202 and/or mounting compartment 206, at least when the chamber 202 is not deployed. Removal of one or more of the back portion 152, seat portion 156, or side portion 160 may therefore not affect the undeployed side airbag system 200, and so the side airbag system 200 may not need to be removed or disarmed. For example, removing one or more of the back portion 152, seat portion 156, or side portion 160 may not affect electrical connections to the side airbag system 200, such as electrical connections for providing an impact signal to the inflator 204. For example, it may not be necessary to remove such connections. Thus removing one of the component of the seat assembly 150 may not generate any signal or vibration that could trigger the side airbag system 200, allowing the side airbag system 200 to remain armed.

As discussed above, and as illustrated in FIGS. 1 and 2A, the seat portion 156 may define a seating area 157. The seating area 157 may have an external side 159. The chamber 202 may expand through the seam 170 and between the side portion 160 and the external side 150 of the seating area 157. Thus, the chamber 202 may expand in an unoccupied space, adjacent to where an occupant may sit. Such an arrangement may limit the chance of the chamber 202 impacting on an occupant as it expands towards the front surface 158 of the seat portion 156.

Figure 3A:
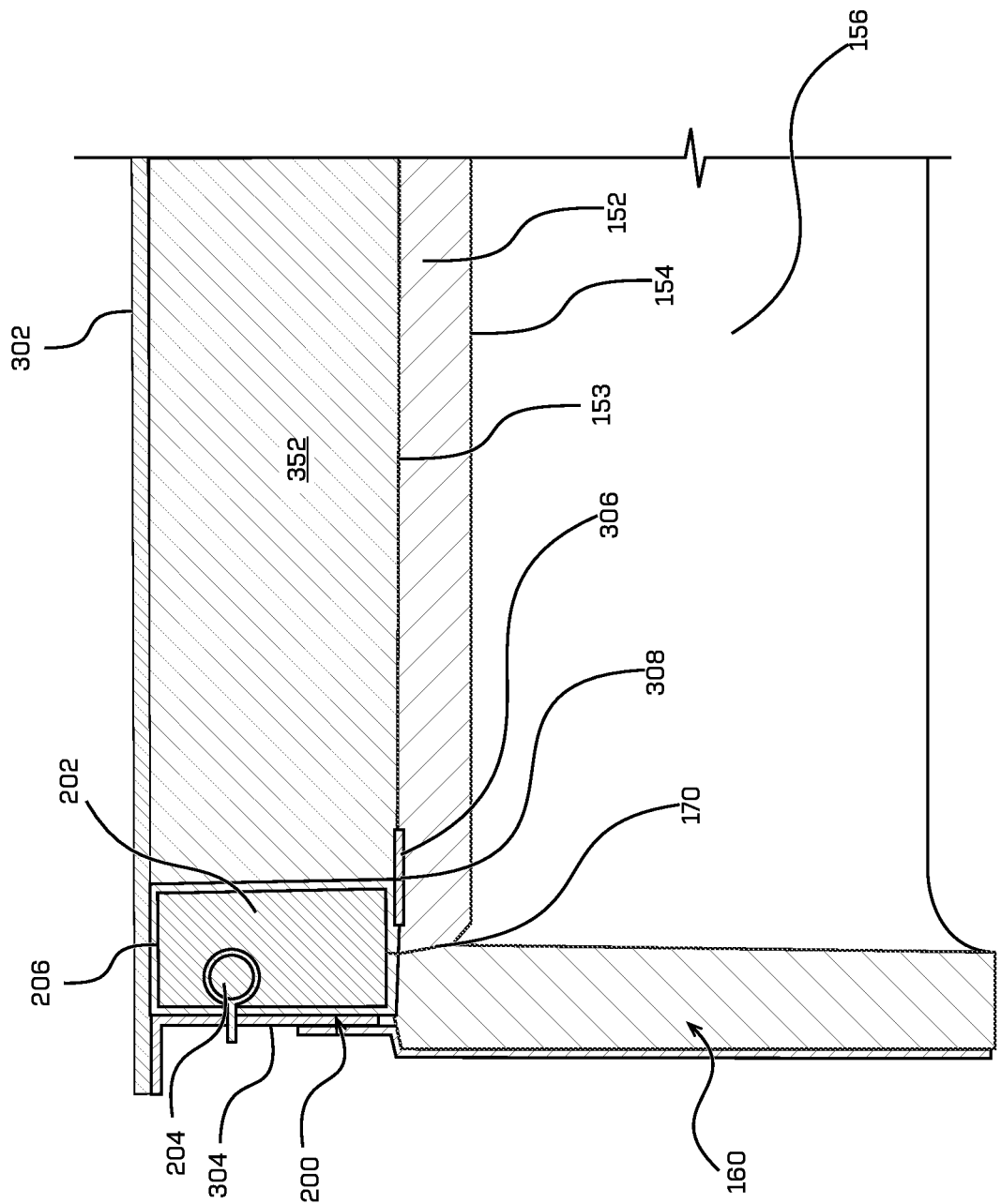
FIG. 3A is a cross-sectional view of the example side airbag system of FIG. 1 in which the side airbag is in an undeployed or stowed state.
Figure 3B:
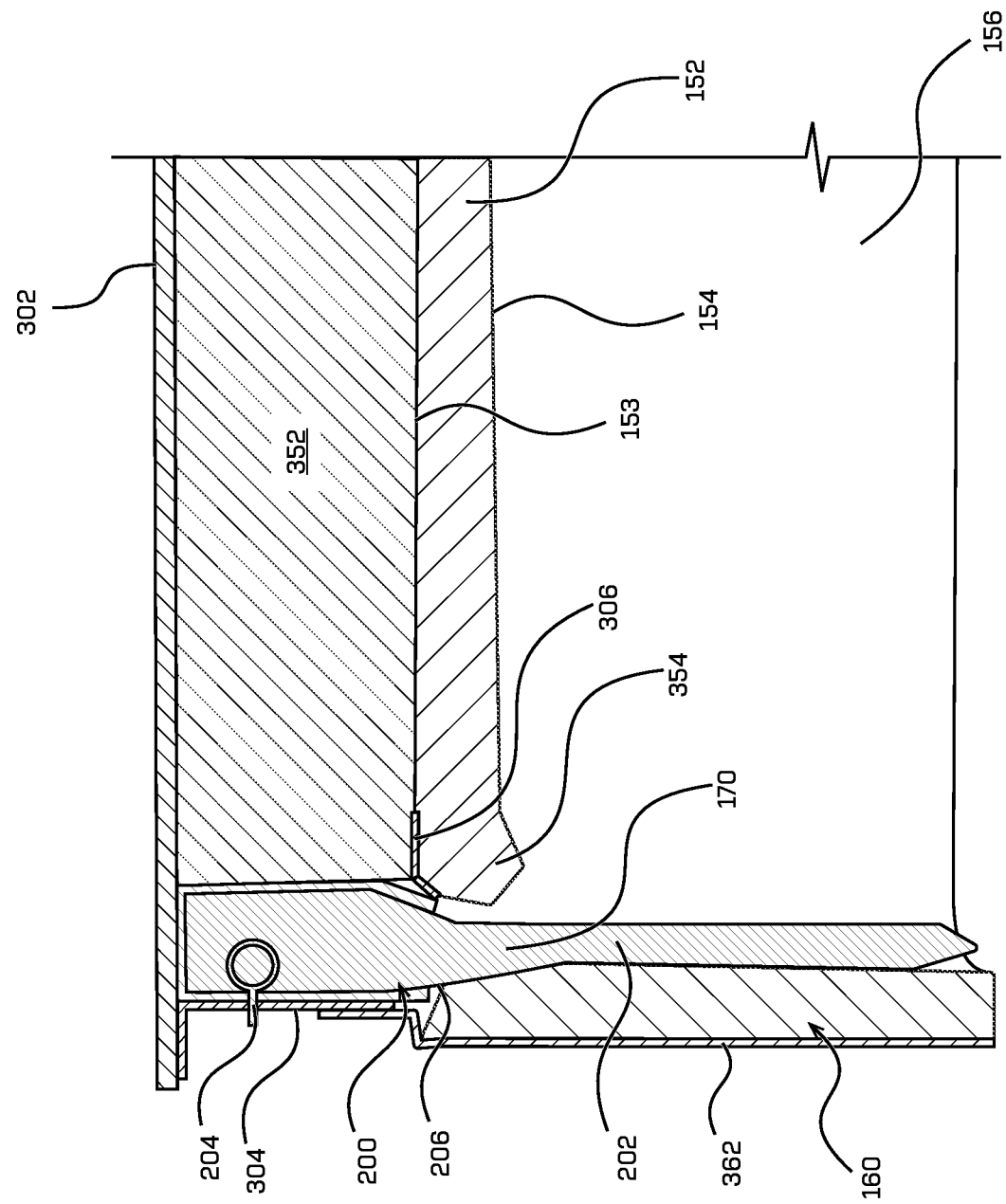
FIG. 3B is a cross-sectional view of the example side airbag system of FIG. 1 in which the side airbag is in a deployed state.

FIGS. 3A and 3B show a horizontal cross-section through the seat assembly 150 and side airbag system 200, i.e. a cross-section in a plane parallel to an upper surface of the seat portion 156. The figures show a view looking down on the cross-section from above. FIG. 3A shows the side airbag system 200 in an undeployed state. FIG. 3B shows the side airbag system 200 in a deployed state.

As illustrated in FIG. 3A, the side airbag system 200 may comprise a mounting compartment 206. Mounting compartment 206 may provide a container for storing or holding the chamber 202 prior to inflation. In various examples, the chamber 202 may be mounted, for example within the mounting compartment 206, in a folded position. In such examples, the chamber 202 may be folded in a roll fold, a tuck fold, a z-fold, origami-inspired fold, and/or any other style of fold of an airbag. In other examples, the chamber 202 may be mounted in an unfolded position. In such examples, the chamber 202 may be configured to deploy at a faster rate than an airbag mounted in the folded position.

The mounting compartment 206 may include a plastic material (e.g., polypropylene, polyethylene, etc.), a metal material (e.g., aluminum, titanium, etc.), a composite material (e.g., carbon fiber, fiber glass, etc.), a fabric material (e.g., cotton, polypropylene, etc.), a rubber material (e.g., polyisoprene, EPDM ethylene propylene, neoprene, etc.), a foam material (e.g., polystyrene, polyethylene, etc.), and/or any other material capable of housing the chamber 202 and allowing the chamber to deploy.

As illustrated, the mounting compartment 206 may be coupled to a frame 302 of the vehicle. The frame 302 may be part of the body 102 of the vehicle. Alternatively, the frame 302 may be a seat attachment frame for attaching the seat assembly 150 to the vehicle. In other examples, the mounting compartment 206 may be coupled to the seat assembly 150 itself, for example attached to a rear surface of the back portion 152 and/or side portion 160, or any other component of the seat assembly 150 that is located behind the seat from the occupant's point of view.

The mounting compartment 206 (or generally the side airbag system 200) may be coupled to the vehicle (e.g. frame 302) by a one or more couplings 304. The coupling(s) 304 may include brackets, snap-fit couplings, screws, rivets, spring-type couplings, and/or or any other mechanical coupling configured to securely couple the mounting compartment 206 (or generally side airbag system 200) to a surface.

In examples, as illustrated in FIG. 3A, back portion 152 may comprise a back support portion or support frame 352 configured to provide support for the back portion 152. In examples, back support portion 352 may be coupled to the vehicle body 102 or a seat frame that may be coupled to the vehicle body. Back support portion 352 in examples may also be coupled to the back portion 152. The back support portion 352 may have a width that is greater than the width of the back portion 152 (e.g. the distance between the exterior facing surface 152 and the interior facing surface 154). Using the back support portion 352 to support the back portion 152 may allow the back portion 152 to be thinner than it would otherwise have to be, allowing easier deflection of the back portion 152 under pressure from the chamber 202.

The back portion 152 in examples may be positioned to extend laterally towards side portion 160 such that at least a part of the back portion 152 covers, in a lateral direction, at least a portion of the undeployed side airbag system 200, such as the mounting compartment 206 of the side airbag system. When the chamber 202 is inflated, the back portion 152 (or a part thereof) may have to move or otherwise deform to enlarge or expand the seam or space available for the chamber 202 to expand through the seam. In some examples, at least a part of the back portion 152 may bend or deform (e.g. squash) under pressure of the inflating chamber 202. The back portion 152 may bend towards the interior of the passenger compartment 104. In some examples, a hinge 306 may be attached to the rear or exterior surface of the back portion 152 as it extends to at least partially cover the mounting compartment 206. The hinge 306 in examples, in addition to being coupled to back portion 152 may also be coupled to the back support portion 352. For example, first lateral portion of the hinge 206 may be coupled to the back portion 152 and the back support portion 352. A second lateral portion of the hinge 206 may be coupled only to the back portion 152. The second lateral portion of the hinge 206 may bend with the back portion 152 during the inflation, while the first lateral portion may remain in a fixed position. Hinge 306 may provide increased stability to the part of the back portion 152 that is not supported by the back frame 352. Under pressure from the chamber 202 during expansion, part of the hinge 306 may rotate forwards or in a longitudinal direction around a point of hinging 308, as illustrated in FIG. 3B. The hinge 306 may guide movement of the back portion 152 forwards under pressure from the chamber 202, and may yield increased reproducibility in the behavior of the back portion 152 during expansion. In some examples, the hinge 306 may be coupled to a lateral end portion of the back portion 152 (i.e. a portion proximal to the side portion 160). The deformation guided by the hinge 306 may be of said lateral end portion of the back portion 152. Although shown as a separate component, in some examples the hinge 306 may be incorporated into the back portion 152. In some examples, the hinge 306 may represent a weakened area of the back portion 152, weakened such that the back portion 152 bends under pressure at the weakened area. As illustrated, in some examples the mounting compartment 206 may be proximate to or may abut the hinge 306. Upon inflation, the chamber 202 may push a door portion 602 (see FIG. 6) of the mounting compartment 206 towards the hinge 306, such that the door portion 602 presses against the hinge 306 rather than the chamber 202 itself. It is noted that in some examples, part of the side portion 160 (or generally the adjacent portion) may additionally or alternatively extend laterally at least partially to cover the mounting compartment 206, and may move or deform under pressure from the chamber 202 during inflation. The side portion 160 (or generally the adjacent portion) may comprise a hinge similar to hinge 306 described above.

Figure 4:
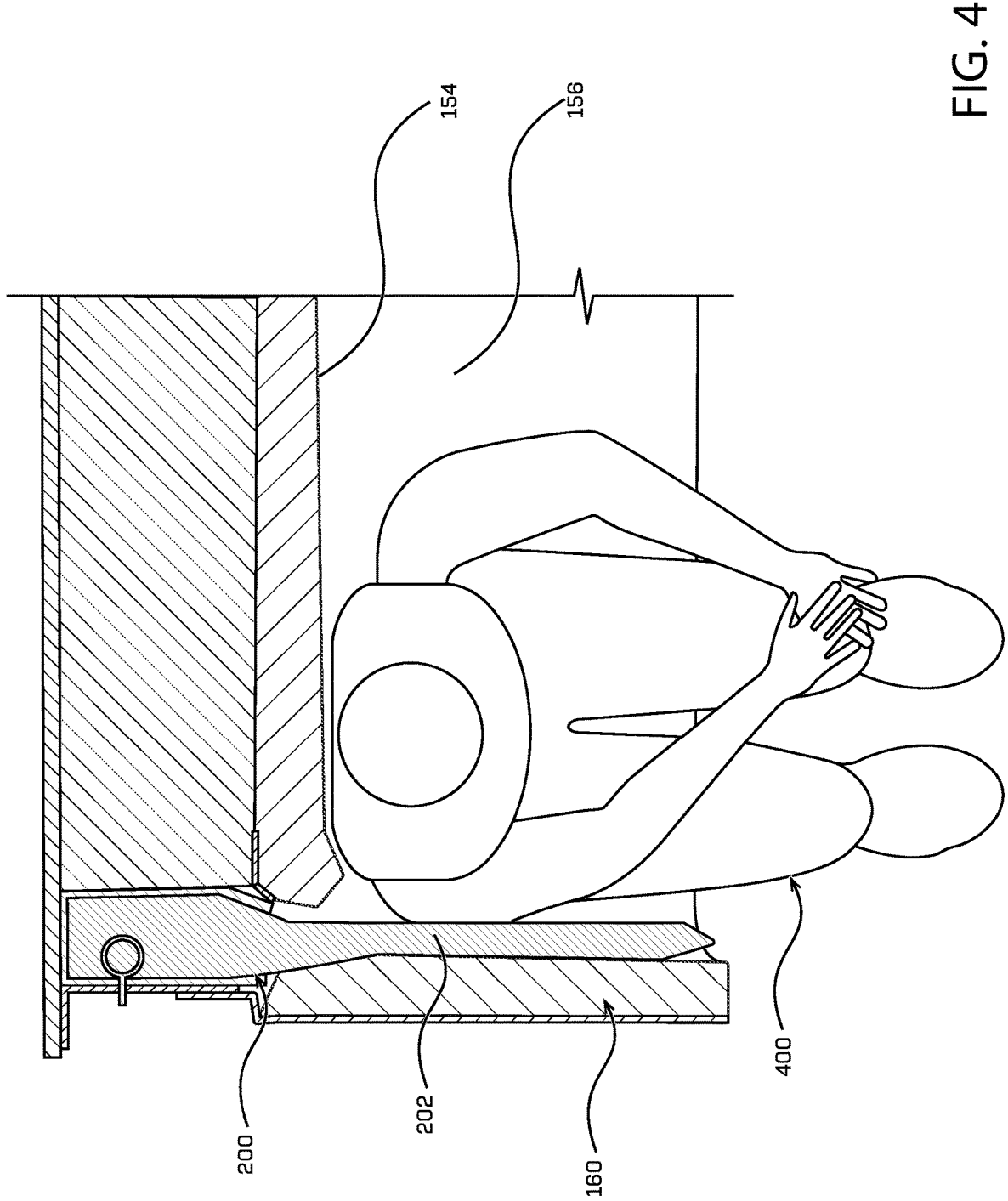
FIG. 4 is a top view illustrating an occupant in the seat assembly with the side airbag system deployed.

FIG. 4 illustrates the side airbag system 200 in a deployed state, with an occupant 400 sitting on the seat portion 156 of seat assembly 150. As can be seen, the inflated chamber 202 may extend between the side portion 160 and the occupant 400. The part of the chamber 202 facing the occupant 400 may be considered a contact surface. During an impact, for example a side impact, the occupant 400 may press into the chamber 202, cushioning the impact.

Figure 5:
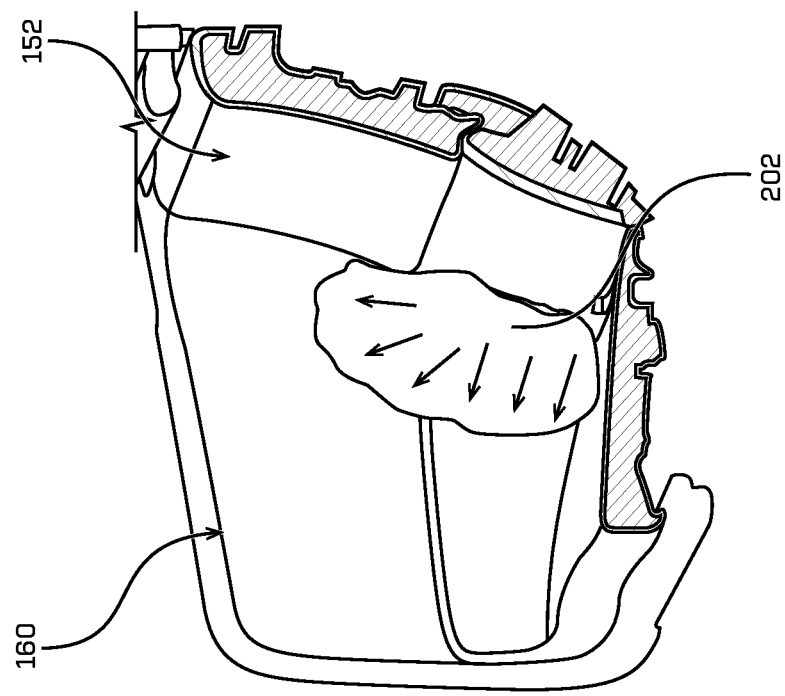
FIG. 5 is a perspective view illustrating an example two-stage inflation of a chamber of an example side airbag system of the present disclosure.
Figure 5:
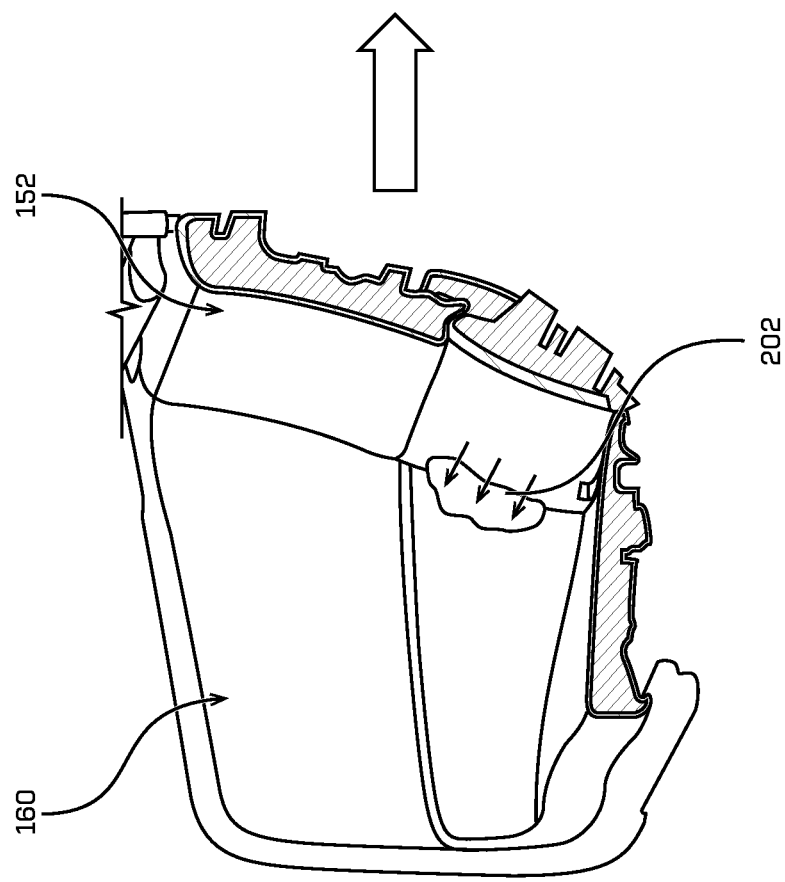

In some examples, such as that illustrated in FIGS. 1 and 2A, the chamber 202 may extend through only a lower portion of the seam 170, proximate the seat portion 156. In some examples, the chamber 202 may expand forwards during the inflation from the lower portion, providing side protection for an occupant's pelvis. In other examples, however, it may be desired to protect both the pelvis and the thorax of an occupant with the chamber 202. In such examples, the chamber 202 may be configured to expand in two stages. FIG. 5 illustrates such a two-stage expansion of the chamber 202. In a first stage, on the left hand of FIG. 5, the chamber 202 expands (at least primarily) in a first, longitudinally forwards direction, i.e., towards the interior of the vehicle. In a second stage, on the right hand of FIG. 5, the chamber 202 expands in a second direction, towards a roof of the vehicle. In the second stage, the chamber 202 may also continue to expand in the first direction. In some examples, the chamber 202 may comprise multiple chambers arranged to direct air during inflation to cause such a two-stage expansion. Such examples may therefore provide an airbag protecting a substantial length of an occupant's torso, while still stowing the airbag before deployment in a small volume. In other examples, such as that shown in FIG. 2B, the chamber 202 may be stowed in a longer form, for example running parallel to the seam 170. The length of the stowed chamber 202 may substantially match the length of the deployed chamber 202. The chamber 202 may then only have to expand in the forwards direction through the seam 170 to provide both pelvis and thorax protection for an occupant.

In various examples, the side airbag system 200 (and/or seat assembly 150) may comprise one or more deflectors. The deflector(s) may be configured to limit lateral expansion of the chamber 202. Here, the lateral direction may extend towards a vehicle interior from the interior facing surface 166 of the side portion 160. The lateral direction may extend from first side portion 160 to an opposite side portion 160, and/or from one side of the vehicle to the other side of the vehicle, or from one vehicle door to another vehicle door. In other words, the deflectors may be shaped and arranged to restrict the sideways expansion of the chamber 202, directing the chamber longitudinally forwards towards the front edge 156 of the seat portion 156. The deflector(s) may be distinct components configured to direct airflow and/or block expansion of the chamber 202 in the lateral direction. In other examples, the deflector(s) may be provided by components of the side airbag system 200 and/or seat assembly 150. For example, the hinge 306 illustrated in FIG. 3B may act as a deflector. When in the open position, extending into the passenger compartment 102 due to pressure from the chamber 202, the hinge 306 may provide a surface extending substantially forwards. The hinge 308 may limit further rotation beyond this point. As such, the hinge 306 may act as a block, preventing the chamber 202 from expanding sideways and encouraging forwards expansion. Alternatively or additionally, the inflator 204 may comprise a deflector configured to inject air substantially forwards into the chamber 202, and to limit lateral injection of air. In some examples, the mounting compartment 206 may act alternatively or additionally act a deflector. In some examples, the chamber 202 may additionally or alternatively be folded and/or rolled when stowed in a manner such that, upon inflation, the lateral expansion of the chamber 202 is limited.

Figure 6:
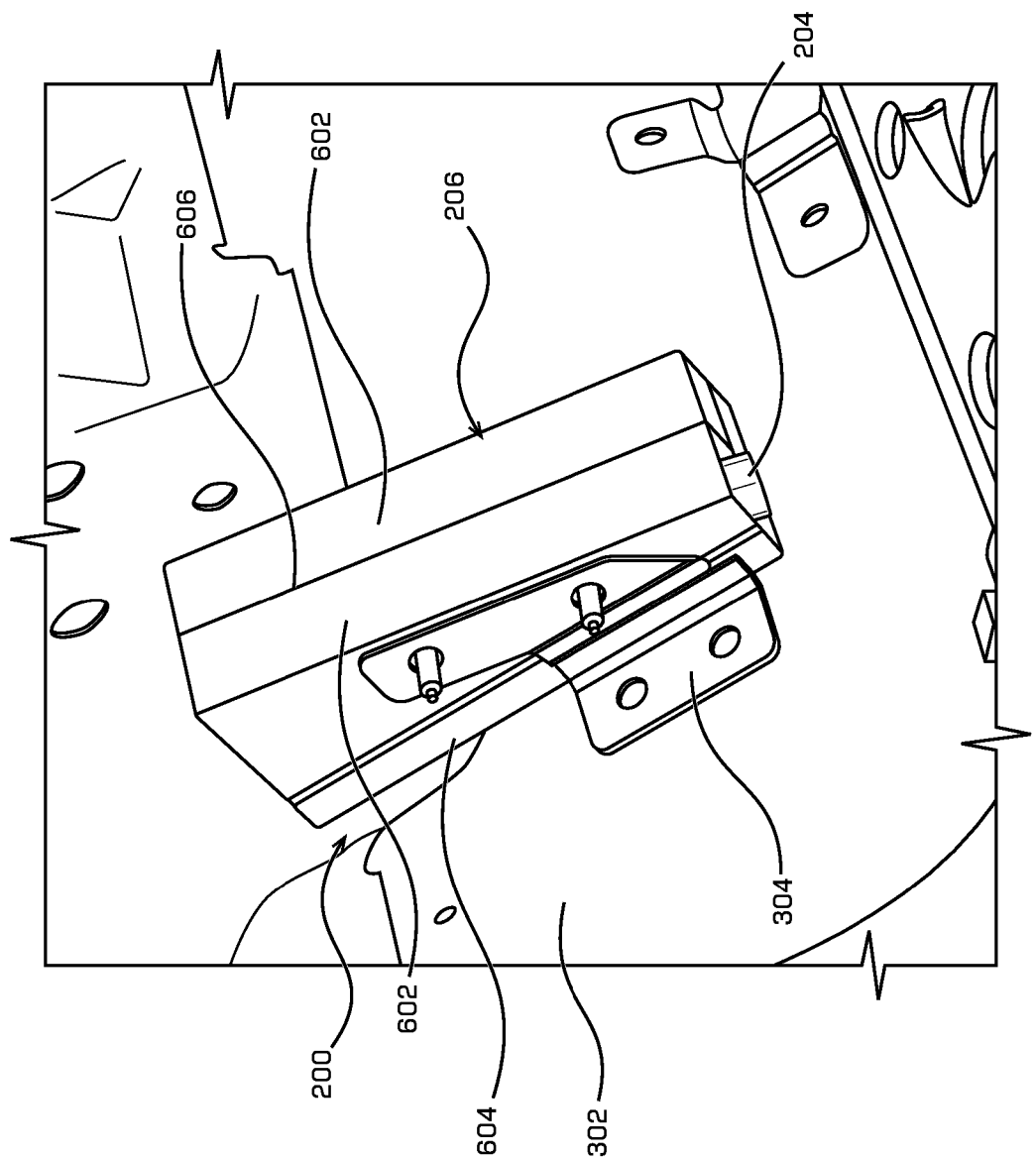
FIG. 6 is a perspective view illustrating an example mounting compartment for stowing a chamber of the side airbag system of the present disclosure.

FIG. 6 illustrates the mounting compartment 206 when the side airbag system 200 is in an undeployed state. The mounting compartment 206 may contain the stowed chamber 202 and the inflator 204. The mounting compartment 206 may be coupled to a vehicle frame 302 by a coupling 304, as discussed above. In some examples, the mounting compartment 206 may comprise one or more door portions 602 pivotably attached to a base portion 604. In the illustrated example, the mounting compartment 206 comprises two door portions, forming a seam 606. When the chamber 202 expands, it may force the door portion(s) to pivot, such that the door portion(s) 602. present a surface(s) extending in the forwards direction. Such surfaces may act as a block preventing sideways expansion of the chamber 202, and so provide deflector(s). In some examples the coupling 304 may be configured to facilitate such pivoting of the door portion(s) 602. For example, the coupling 602 may comprise a hinge allowing rotation of a door portion 602 until the door portion 602 extends forwards.

Figure 7:
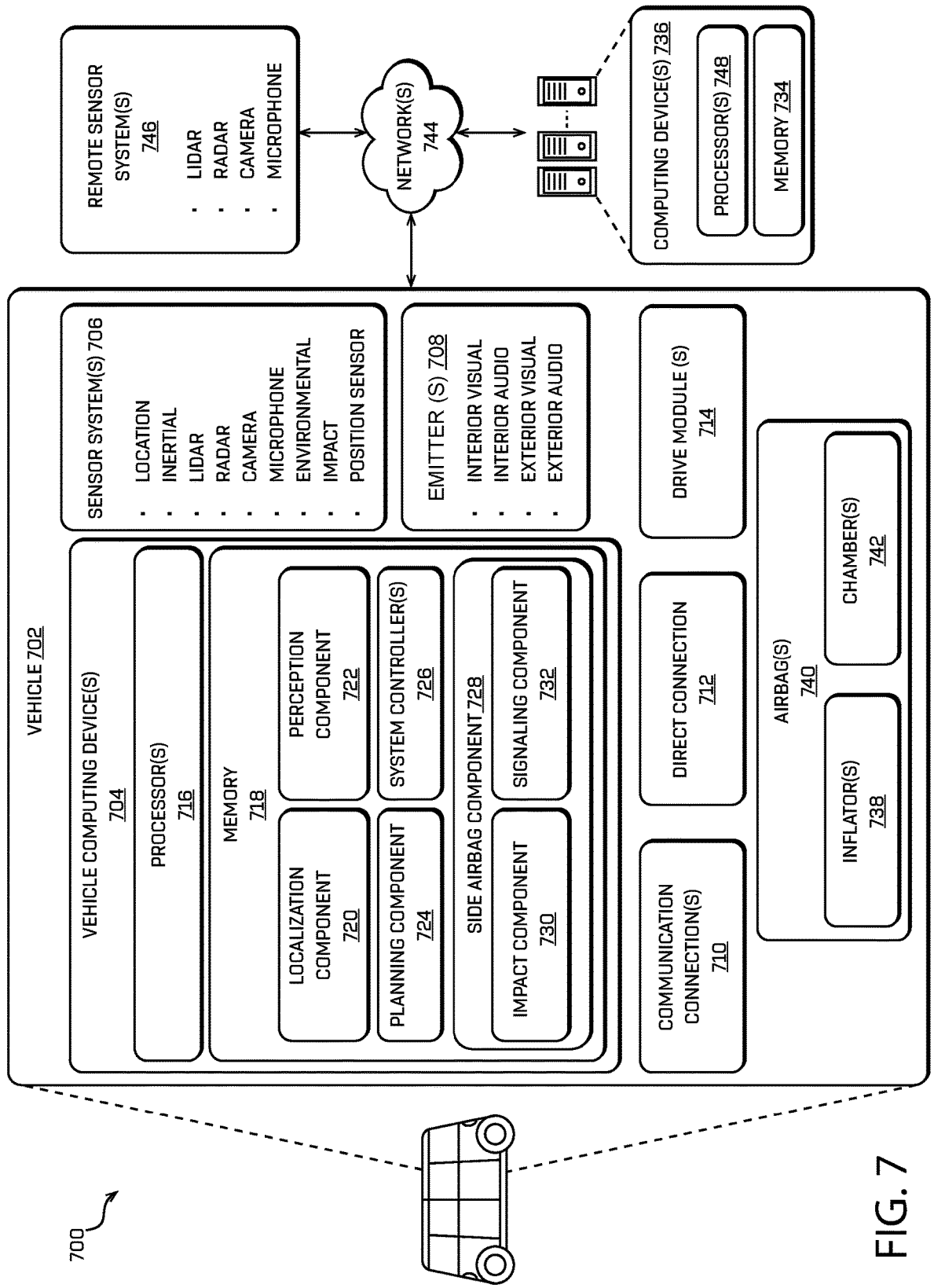
FIG. 7 is a block diagram of an example system for implementing the techniques described herein.

FIG. 7 is a block diagram of an example system 700 for implementing the techniques described herein. In at least one example, the system 700 may include a vehicle 702, such as the vehicle in which a seat assembly 150 may be mounted as described above with regard to FIGS. 1-6.

The vehicle 702 may include a vehicle computing device 704, one or more sensor systems 706, one or more emitters 708, one or more communication connections 710, at least one direct connection 712, and one or more drive modules 714.

The vehicle computing device 704 may include one or more processors 716 and memory 718 communicatively coupled with the one or more processors 716. The vehicle 702 may include any type of vehicle, such as an autonomous vehicle, a semi-autonomous vehicle, or any other system having at least an image capture device (e.g., a camera enabled smartphone). In the illustrated example, the memory 718 of the vehicle computing device 704 stores a localization component 720, a perception component 722, a planning component 724, one or more system controllers 726, and a side airbag component 728 including an impact component 730, and a signaling component 732. Though depicted in FIG. 7 as residing in the memory 718 for illustrative purposes, it is contemplated that the localization component 720, the perception component 722, the planning component 724, the system controllers 726, and the side airbag component 728 including the impact component 730, and the signaling component 732 may additionally, or alternatively, be accessible to the vehicle 702 (e.g., stored on, or otherwise accessible by, memory remote from the vehicle 702, such as, for example, on memory 734 of a remote computing device 736).

In at least one example, the localization component 720 may include functionality to receive data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of a vehicle for determining whether a side impact with an object may occur (e.g., imminent impact), as discussed herein.

In some examples, the perception component 722 may include functionality to perform object detection, segmentation, and/or classification. In some examples, the perception component 722 may provide processed sensor data that indicates a presence of an object that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary object that is proximate to the vehicle 702 and/or a classification of the stationary object as a type (e.g., building, tree, road surface, pole, curb, sidewalk, unknown, etc.). In additional or alternative examples, the perception component 722 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 724 may determine a path for the vehicle 702 to follow to traverse through an environment. For example, the planning component 724 may determine various routes and trajectories and various levels of detail. For example, the planning component 724 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 724 may generate an instruction for guiding the autonomous vehicle along at least a portion of the route from the first location to the second location. In at least one example, the planning component 724 may determine how to guide the vehicle 702 from a first waypoint in the sequence of waypoints to a second waypoint in the sequence of waypoints. In some examples, the instruction can be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 702 to navigate.

In some examples, the planning component 724 may include a prediction component to generate predicted trajectories of objects in an environment. For example, a prediction component may generate one or more predicted trajectories for objects within a threshold distance from the vehicle 702. In some examples, a prediction component may measure a trace of an object and generate a trajectory for the object based on observed and predicted behavior.

In at least one example, the vehicle computing device 704 may include one or more system controllers 726, which may be configured to control steering, propulsion, braking, safety, emitters, communication, and other systems of the vehicle 702. The system controller(s) 726 may communicate with and/or control corresponding systems of the drive module(s) 714 and/or other components of the vehicle 702.

As illustrated in FIG. 7, the vehicle computing device 704 may include a side airbag component 728. The side airbag component 728 may include an impact component 730 configured to determine an imminent impact (e.g., frontal impact, side impact, glancing impact, etc.) with an object. In various examples, side airbag component 728 may receive data from the perception component 722 regarding one or more objects in an environment. The data may include a trajectory of the object(s), speed of the object(s) to include a closing speed (e.g., closure rate), acceleration of the object(s), a bearing from the vehicle 702 to the object, and/or any other data to assist the impact component 730 in determining that an impact with an object is imminent.

In various examples, the impact component 730 may be configured to determine a time associated with the imminent impact. The time may be a particular time, such as, for example, 120 milliseconds after 3:05 pm, or it may be a time interval from a time in which imminent impact was determined. The time may be determined based on a measured closure rate of the object toward the vehicle 702, a velocity of the vehicle 702, an acceleration of the vehicle 702, a velocity of the object, an acceleration of the object, road conditions, weather conditions, and/or other factors that may affect a closure rate of an object toward a vehicle or vice versa.

In some examples, the side airbag component 530 may include a signaling component 732. The signaling component 732 may be configured to receive an indication of imminent impact with an object, such as from the impact component 730, and send a signal to one or more inflators 738 of one or more airbags 740, such as airbag 102. In various examples, the signal may cause an inflator 738 to expel gas into a chamber 742 of an airbag 740, upon receipt of the signal. In some examples, the signal may include a timing component. In such examples, the signal may cause the inflator 738 to expel gas into a chamber 742 of the airbag 740 at a particular time and/or after an indicated period of time (e.g., delay period). For example, the signaling component 732 may receive a time associated with the imminent impact from the impact component 730. The signaling component 732 may include the time in the signal, thereby causing the airbag 740 to deploy upon impact. For another example, the signaling component 732 may include a delay period, thereby causing the airbag 740 to deploy after the delay period. Responsive to receiving the signal, the inflator 738 may cause the chamber 742 to deploy toward a passenger seated in a passenger compartment of the vehicle 702.

As can be understood, the components discussed herein (e.g., the localization component 720, the perception component 722, the planning component 724, the one or more system controllers 726, the side airbag component 728 including the impact component 730, and the signaling component 732 are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 718 (and the memory 734, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 706 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. In various examples, the sensor system(s) 706 may include a position sensor configured to determine whether a passenger is seated in a seat assembly. In some examples, the position sensor may include a weight switch configured to determine whether a weight is located on the seat assembly. The weight may include a minimum weight associated with a passenger (e.g., 50 pounds, 25 kilograms, 100 pounds, etc.). In various examples, the position sensor may include an image capture device and/or other perception sensor. In such examples, the image capture device and/or other perception sensor may send sensor data to the vehicle computing device to analyze and determine whether the object in the seat assembly is a passenger (e.g., whether it is a human or other live animal).

The sensor system(s) 706 can include multiple instances of each of these or other types of sensors. For instance, the LIDAR sensors can include individual LIDAR sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device 704. Additionally or alternatively, the sensor system(s) 706 may send sensor data, via the one or more networks 744, to the one or more computing device(s) 736 at a particular frequency, after a lapse of a predetermined period of time, in near real-time, etc.

The vehicle 702 may also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive module(s) 714. Also, the communication connection(s) 710 can allow the vehicle to communicate with other nearby computing device(s) (e.g., computing device(s) 736, other nearby vehicles, etc.) and/or one or more remote sensor system(s) 746 for receiving sensor data.

The communications connection(s) 710 may include physical and/or logical interfaces for connecting the vehicle computing device 704 to another computing device or a network, such as network(s) 744. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive modules 714. In some examples, the vehicle 702 can have a single drive module 714. In at least one example, if the vehicle 702 has multiple drive modules 714, individual drive modules 714 may be positioned on opposite ends of the vehicle 702 (e.g., the front and the rear, etc.). In at least one example, the drive module(s) 714 may include one or more sensor systems to detect conditions of the drive module(s) 714 and/or the surroundings of the vehicle 702. By way of example and not limitation, the sensor system(s)

can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 714. In some cases, the sensor system(s) on the drive module(s) 714 can overlap or supplement corresponding systems of the vehicle 702 (e.g., sensor system(s) 706).

The drive module(s) 714 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 714 may include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 714. Furthermore, the drive module(s) 714 may also include one or more communication connection(s) that enable communication by the respective drive module with one or more other local or remote computing device(s).

In at least one example, the direct connection 712 may provide a physical interface to couple the one or more drive module(s) 714 with the body of the vehicle 702. For example, the direct connection 712 may allow the transfer of energy, fluids, air, data, etc. between the drive module(s) 714 and the vehicle. In some instances, the direct connection 712 can further releasably secure the drive module(s) 714 to the body of the vehicle 702.

In at least one example, the localization component 720, the perception component 722, the planning component 724, the one or more system controllers 726, and the side airbag component 728 and various components thereof, may process sensor data, as described above, and may send their respective outputs, over the one or more network(s) 744, to the computing device(s) 736. In at least one example, the localization component 720, the perception component 722, the planning component 724, the one or more system controllers 726, and the side airbag component 728 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 744. In some examples, the vehicle 702 may receive sensor data from the computing device(s) 736 and/or from remote sensor systems 746 via the network(s) 744. The sensor data may include raw sensor data and/or processed sensor data and/or representations of sensor data. In some examples, the sensor data (raw or processed) may be sent and/or received as one or more log files.

The computing device(s) 736 may include processor(s) 748 and a memory 734 configured to store data. The processor(s) 716 of the vehicle 702 and the processor(s) 748 of the computing device(s) 736 may be any suitable processor capable of executing instructions to process data and perform operations as described herein. By way of example and not limitation, the processor(s) 716 and 748 may comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 734 are examples of non-transitory computer-readable media. The memory 718 and 734 may store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 718 and 734 may include at least a working memory and a storage memory. For example, the working memory may be a high-speed memory of limited capacity (e.g., cache memory) that is used for storing data to be operated on by the processor(s) 716 and 748. In some instances, the memory 718 and 734 may include a storage memory that may be a lower-speed memory of relatively large capacity that is used for long-term storage of data. In some cases, the processor(s) 716 and 748 cannot operate directly on data that is stored in the storage memory, and data may need to be loaded into a working memory for performing operations based on the data, as discussed herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

Figure 8:
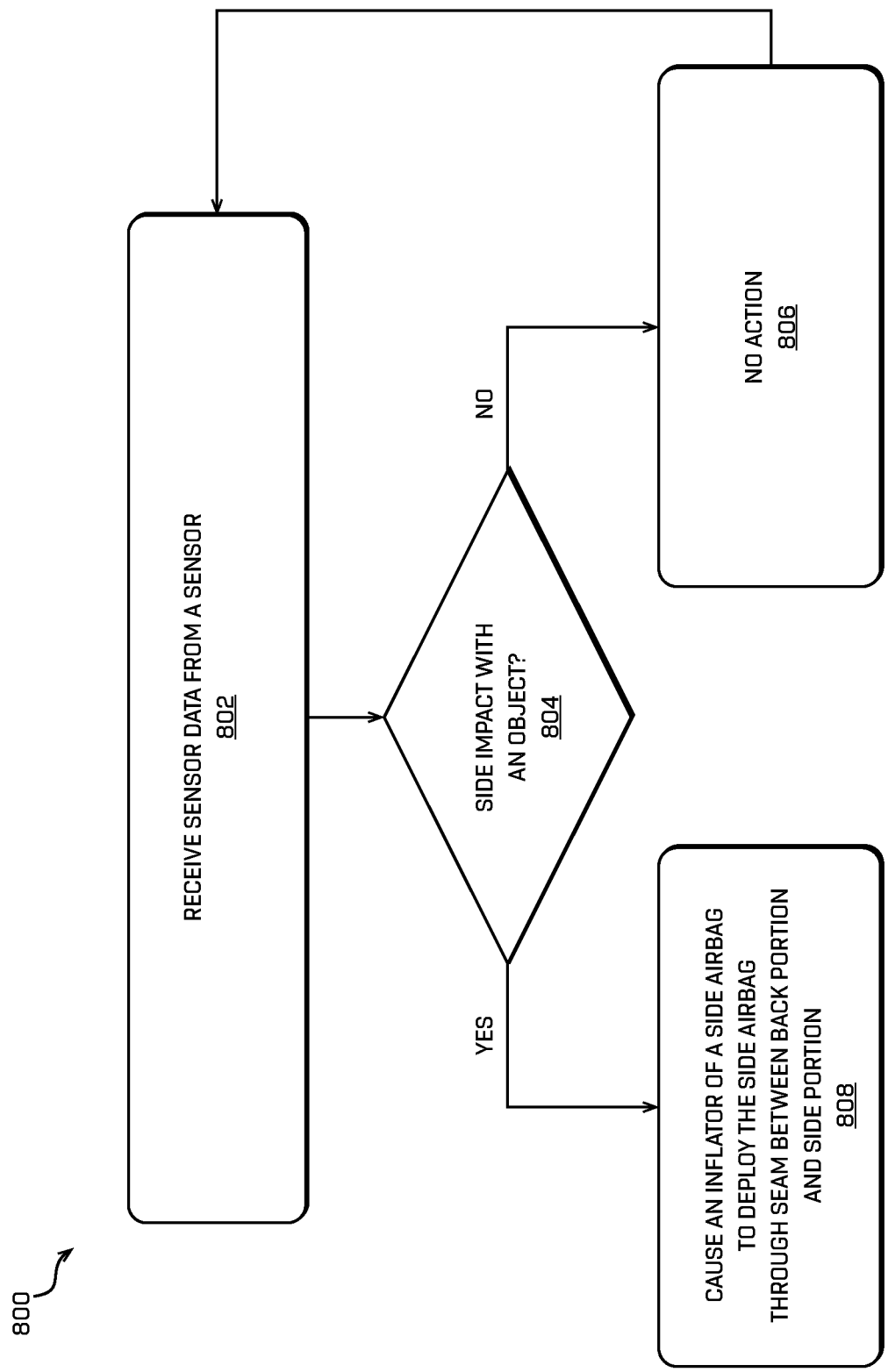
FIG. 8 is a flow chart of an example process for causing a deployment of a side airbag system of the present disclosure.

FIG. 8 illustrates an example process in accordance with embodiments of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 8 depicts an example process 800 for causing a deployment of a side airbag of a vehicle. For example, some or all of the process 800 can be performed by one or more components in FIG. 7, as described herein. For example, some or all of the process 800 may be performed by the vehicle computing device(s) 704.

At operation 802, the process may include receiving sensor data from a sensor. In some examples, the vehicle computing device may receive the sensor data from the sensor. In various examples, the sensor may include a perception sensor, as described above. In such examples, the sensor data may include an indication of an object (e.g., vehicle, bicyclist, pole, wall, or the like) with a constant bearing and decreasing range toward a side of the vehicle. For stationary remote objects, the indication may signal to the vehicle computing device that the vehicle is sliding or otherwise moving sideways toward the stationary remote object.

In some examples, the sensor may include an impact sensor and the sensor data may include an electrical signal indicating impact. In such examples, the impact sensor may send the electrical signal to the inflator.

At operation 804, the process may include determining whether an impact (e.g. a side impact) with an object has occurred and/or is imminent. In some examples, the process may include determining that the impact will occur within a threshold period of time. In various examples, the vehicle computing device may determine the impact has occurred or is imminent based on the received sensor data. In some examples, the vehicle computing device may determine that the impact is imminent based on a high closure rate of the object that cannot or likely will not be stopped in a distance remaining between the vehicle and the object. For example, the vehicle computing device may determine that another vehicle has a constant bearing toward a side of the vehicle and the range is rapidly decreasing at a rate that indicates imminent impact. The vehicle computing device may thus determine that the impact with the other vehicle is imminent.

In some examples, the inflator may receive the electrical signal indicating impact from the impact sensor. In such examples, the inflator may determine the side impact with the object has occurred.

If the vehicle computing device determines that an impact with the object will not occur and/or is not imminent, (e.g., "no" in the operation 804), the process continues to operation 806. At operation 806, the process may include determining that no action is necessary. Based on a determination to take no action with respect to airbag deployment, the process may return to operation 802.

If the time meets or exceeds the threshold period of time (e.g., "yes" in the operation 804), the process continues to operation 808. At operation 808, the process may include causing an inflator of a side airbag system to deploy the side airbag system, causing the chamber 202 to be inflated an expand through a seam 170 as discussed above.

In various examples, the vehicle computing device may cause the inflator to deploy based on a determination that the impact with the object is imminent. In such examples, the vehicle computing device may send a signal to the inflator, thereby causing the inflator to ignite and fill the one or more chambers of the side airbag with gas. In some examples, the inflator may receive the electrical signal directly from the impact sensor. In such examples, the inflator may automatically deploy the one or more chambers of the airbag based on receiving the electrical signal. In some examples, the chamber(s) may be deployed only if a deployment condition is met. For example, the deployment condition may comprise a speed threshold. In such examples, the chamber(s) may only be deployed if the vehicle is travelling at or above the speed threshold. For example, the side airbag system may be placed in a disabled state when the vehicle speed is below the speed threshold, such that the inflator does not respond to a signal from the impact sensor. Alternatively or additionally, the impact sensor may be configured to not send the impact signal if the vehicle speed is below the speed threshold.

Example Clauses

A: A vehicle comprising: a body defining a passenger compartment; a seat assembly disposed in the passenger compartment, the seat assembly comprising: a back portion; and a side portion, the side portion and the back portion positioned to form a seam between the side portion and the back portion; and a side airbag system mounted between the body and the seat assembly, the side airbag system comprising a chamber, and an inflator configured to receive a signal indicative of an impact, and based on the received signal, cause a gas to be provided to the chamber to inflate the chamber; wherein the inflation of the chamber causes the chamber to expand through the seam between the back portion of the seat assembly and the side portion of the seat assembly and to extend along the side portion in a direction away from the back portion to protect an occupant of the seat assembly from side impact by providing a contact surface for the occupant on the chamber.

B: The vehicle of clause A, wherein the inflation of the chamber causes the chamber to expand in a first direction away from the back portion, and in a second direction towards a roof of the vehicle.

C: The vehicle of clause A or clause B, wherein: (i) the seam comprises a length, and (ii), before the inflation of the chamber, the chamber extends at least 50 percent of the length of the seam.

D: The vehicle of clause A or clause B, wherein: (i) the seam comprises a length, and (ii), before the inflation of the chamber, the chamber extends less than 50 percent of the length of the seam.

E: The vehicle of any of clauses A to D, wherein when the chamber is inflated, the chamber is shaped and arranged to protect at least one of: a thorax, or a pelvis of an occupant when the occupant is seated in the seat assembly.

F: The vehicle of any of clauses A to E, wherein at least one of the back portion or the side portion of the seat assembly is coupled to the vehicle so as to be removable from the vehicle without removing the side airbag system.

G: A bench seating and side airbag system comprising: a back portion having: an interior facing surface; and an exterior facing surface opposite the interior facing surface; an adjacent portion, the adjacent portion and the back portion positioned to define a seam between the back portion and the adjacent portion; a chamber configured to be mounted proximate the seam and behind the exterior facing surface of the back portion; and an inflator coupled to the chamber, the inflator configured to inflate the chamber; wherein the inflation of the chamber causes the chamber to extend through the seam and beyond the interior facing surface of the back portion.

H: The bench seating and side airbag system of clause G, further comprising a deflector structured and arranged to limit expansion of the chamber in a lateral direction during the inflation of the chamber, the lateral direction extending, when the bench seating and side airbag system is positioned within a vehicle, from a first side of the vehicle to a second side of the vehicle.

I: The bench seating and side airbag system of clause H, further comprising a mounting compartment configured to be coupled to a vehicle body, wherein the mounting compartment is structured and arranged to hold the chamber prior to the inflation of the chamber and to limit expansion of the chamber in a lateral direction during the inflation of the chamber.

J: The bench seating and side airbag system of clause H or clause I, wherein the deflector is structured and arranged to limit injection of air into the chamber parallel to the lateral direction during the inflation of the chamber.

K: The bench seating and side airbag system of any of clauses H to J, wherein: (i) the back portion comprises a first portion configured to deform by bending under pressure during the inflation of the chamber, and (ii) the deflector comprises the first portion of the back portion.

L: The bench seating and side airbag system of any of clauses G to K, further comprising a hinge coupled to the back portion and wherein the inflation of the chamber causes the hinge and the back portion to deform so as to expand the seam through which the chamber expands during the inflation of the chamber.

M: The bench seating and side airbag system of clause L, wherein the hinge is coupled to a lateral end portion of the back portion and the deformation of the back portion occurs at the lateral end portion of the back portion.

N: The bench seating and side airbag system of any of clauses G to M, further comprising a back support portion positioned so as to provide support for the back portion.

O: The bench seating and side airbag system of any of clauses G to N, further comprising a seat portion; and wherein: (i) the seat portion is shaped and arranged to define seating area for an occupant, and (ii) the seam between the adjacent portion and the back portion is positioned such that the chamber expands between the adjacent portion and an exterior facing side of the seating area.

P: The bench seating and side airbag system of any of clauses G to O, wherein the inflation of the chamber causes the chamber to expand substantially in a first direction parallel to an axis extending between the exterior facing surface of the back portion and an interior facing surface of the back portion.

Q: The bench seating and side airbag system of any of clauses G to P, wherein the inflation of the chamber causes the chamber to expand in a first direction and a second direction, the first direction parallel to an axis extending between the exterior facing surface of the back portion and an interior facing surface of the back portion, the second direction parallel to an axis extending between a vehicle floor and a vehicle roof.

R: The bench seating and side airbag system of any of clauses G to Q, wherein the chamber is configured to be mounted to a body of a vehicle behind the exterior surface of the back portion.

S: The bench seating and side airbag system of any of clauses G to R, wherein the chamber is shaped and configured to be mounted such that, when expanded, the chamber provides a contact surface for contacting a side of an occupant that faces an exterior of a vehicle, when the occupant is seated T: The bench seating and side airbag system of any of clauses G to S, wherein the inflator is configured to inflate the chamber upon receipt of an impact signal from an impact sensor.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
   a body defining a passenger compartment;
   a seat assembly disposed in the passenger compartment, the seat assembly comprising:
      a back portion forming a backrest for an occupant when seated in the seat assembly; and
      a side portion, the side portion and the back portion positioned to form a seam between the side portion and the back portion, the side portion extending substantially to a front edge of the seat assembly along a side of the occupant when seated in the seat assembly; and
   a side airbag system mounted between the body and the seat assembly, the side airbag system comprising
      a chamber, and
      an inflator configured to receive a signal indicative of an impact, and based on the received signal, cause a gas to be provided to the chamber to inflate the chamber;
   wherein the inflation of the chamber causes the chamber to expand through the seam between the back portion of the seat assembly and the side portion of the seat assembly and to extend along the side portion in a direction away from the back portion to protect an occupant of the seat assembly from side impact by providing a contact surface for the occupant on the chamber.

2. The vehicle of claim 1, wherein the inflation of the chamber causes the chamber to expand in a first direction away from the back portion, and in a second direction towards a roof of the vehicle.

3. The vehicle of claim 1, wherein: (i) the seam comprises a length, and (ii), before the inflation of the chamber, the chamber extends at least 50 percent of the length of the seam.

4. The vehicle of claim 1, wherein: (i) the seam comprises a length, and (ii), before the inflation of the chamber, the chamber extends less than 50 percent of the length of the seam.

5. The vehicle of claim 1, wherein when the chamber is inflated, the chamber is shaped and arranged to protect at least one of: a thorax, or a pelvis of an occupant when the occupant is seated in the seat assembly.

6. The vehicle of claim 1, wherein at least one of the back portion or the side portion of the seat assembly is coupled to the vehicle so as to be removable from the vehicle without removing the side airbag system.

7. A bench seating and side airbag system comprising:
   a back portion having:
      an interior facing surface forming a backrest for an occupant; and
      an exterior facing surface opposite the interior facing surface;
   an adjacent portion, the adjacent portion and the back portion positioned to define a seam between the back portion and the adjacent portion;
   a chamber configured to be mounted proximate the seam and behind the exterior facing surface of the back portion, the chamber configured to be mounted to a frame of a vehicle at a position to a rear of the occupant relative to a forward facing direction of the occupant when the occupant is seated; and
   an inflator coupled to the chamber, the inflator configured to inflate the chamber;
   wherein the inflation of the chamber causes the chamber to extend through the seam and beyond the interior facing surface of the back portion.

8. The bench seating and side airbag system of claim 7, further comprising a deflector structured and arranged to limit expansion of the chamber in a lateral direction during the inflation of the chamber, the lateral direction extending, when the bench seating and side airbag system is positioned within a vehicle, from a first side of the vehicle to a second side of the vehicle.

9. The bench seating and side airbag system of claim 8, further comprising a mounting compartment configured to be coupled to a vehicle body, wherein the mounting compartment is structured and arranged to hold the chamber prior to the inflation of the chamber and to limit expansion of the chamber in a lateral direction during the inflation of the chamber.

10. The bench seating and side airbag system of claim 8, wherein the deflector is structured and arranged to limit injection of air into the chamber parallel to the lateral direction during the inflation of the chamber.

11. The bench seating and side airbag system of claim 8, wherein: (i) the back portion comprises a first portion configured to deform by bending under pressure during the inflation of the chamber, and (ii) the deflector comprises the first portion of the back portion.

12. The bench seating and side airbag system of claim 7, further comprising a hinge coupled to the back portion and wherein the inflation of the chamber causes the hinge and the back portion to deform so as to expand the seam through which the chamber expands during the inflation of the chamber.

13. The bench seating and side airbag system of claim 12, wherein the hinge is coupled to a lateral end portion of the back portion and the deformation of the back portion occurs at the lateral end portion of the back portion.

14. The bench seating and side airbag system of claim 7, further comprising a back support portion positioned so as to provide support for the back portion.

15. The bench seating and side airbag system of claim 7, further comprising a seat portion; and wherein: (i) the seat portion is shaped and arranged to define seating area for an occupant, and (ii) the seam between the adjacent portion and the back portion is positioned such that the chamber expands between the adjacent portion and an exterior facing side of the seating area.

16. The bench seating and side airbag system of claim 7, wherein the inflation of the chamber causes the chamber to expand substantially in a first direction parallel to an axis extending between the exterior facing surface of the back portion and an interior facing surface of the back portion.

17. The bench seating and side airbag system of claim 7, wherein the inflation of the chamber causes the chamber to expand in a first direction and a second direction, the first direction parallel to an axis extending between the exterior facing surface of the back portion and an interior facing surface of the back portion, the second direction parallel to an axis extending between a vehicle floor and a vehicle roof.

18. The bench seating and side airbag system of claim 7, wherein the chamber is shaped and configured to be mounted such that, when expanded, the chamber provides a contact surface for contacting a side of an occupant that faces an exterior of a vehicle, when the occupant is seated.

19. The bench seating and side airbag system of claim 7, wherein the inflator is configured to inflate the chamber upon receipt of an impact signal from an impact sensor.

20. A bench seating and side airbag system comprising:
    a back portion having:
        an interior facing surface; and
        an exterior facing surface opposite the interior facing surface;
    a side portion, the side portion and the back portion positioned to define a seam between the back portion and the side portion, the side portion shaped such that a first part of the side portion extends from a seat portion, the first part of the side portion and the seat portion forming a seating area for an occupant to sit on, the side portion comprising a second part extending along a side of the occupant when seated in the seating area;
    a chamber configured to be mounted proximate the seam and behind the exterior facing surface of the back portion; and
    an inflator coupled to the chamber, the inflator configured to inflate the chamber;
    wherein the inflation of the chamber causes the chamber to extend through the seam and beyond the interior facing surface of the back portion.

\* \* \* \* \*